Sept. 20, 1955    A. R. FORSBERG    2,718,307
AIR CONTROL FOR GRAVITY SEPARATOR
Filed Dec. 26, 1950    2 Sheets-Sheet 1

Inventor
Arthur R. Forsberg
By Williamson & Williamson
Attorneys

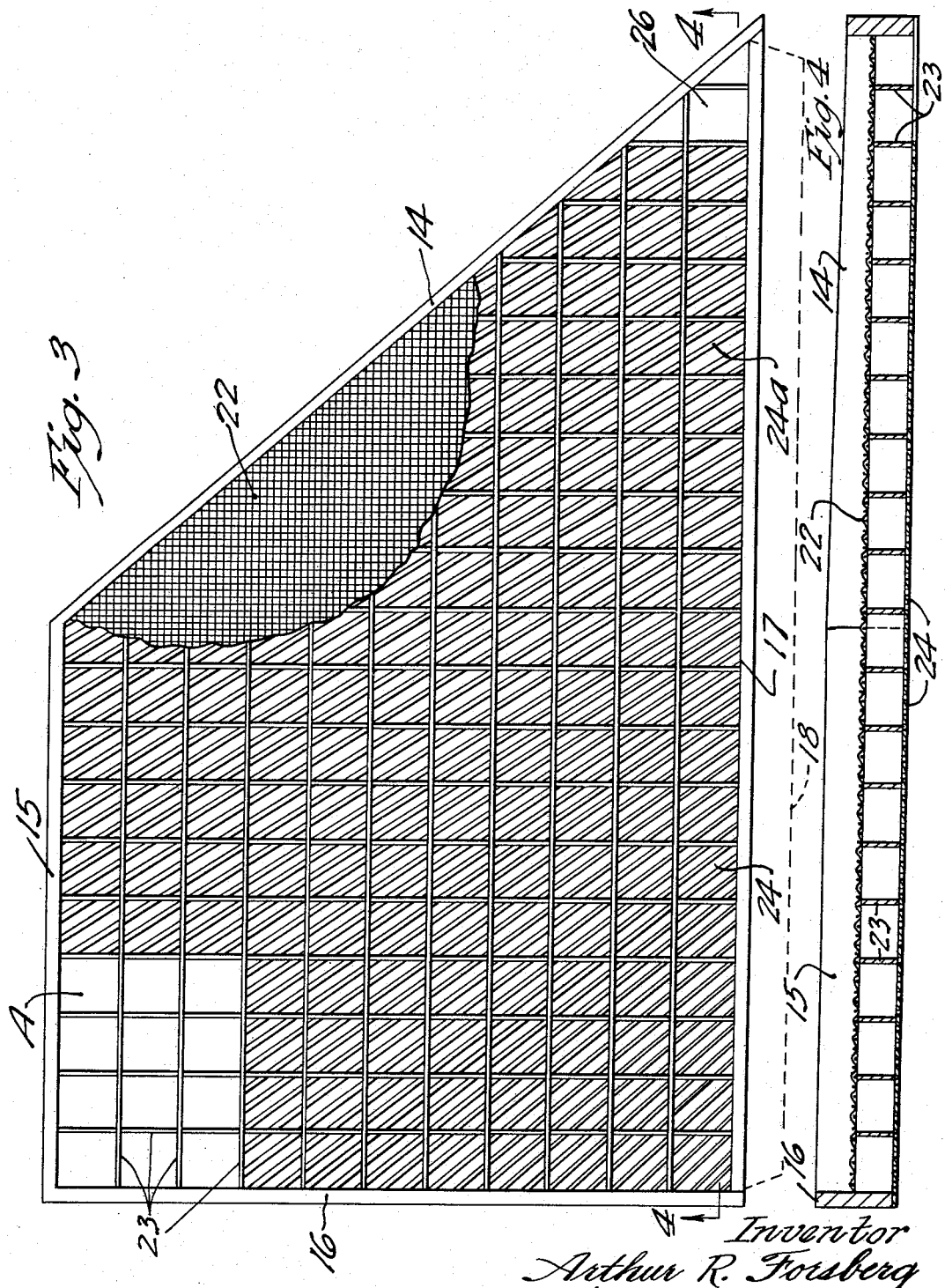

2,718,307
AIR CONTROL FOR GRAVITY SEPARATOR

Arthur R. Forsberg, Thief River Falls, Minn.

Application December 26, 1950, Serial No. 202,588

1 Claim. (Cl. 209—486)

This invention relates to gravity type separators and particularly to a new and improved shaked bed therefor.

In the past, it has been a considerable problem to provide a separator for grains, such as wheat and the like, whereby both the lighter and heavier materials can be efficiently removed therefrom. It is a particular problem to provide an efficient control system for the flow of air upwardly through the separator bed.

It is an object of my invention to provide relatively simple, yet highly efficient, means for distributing the flow of air across the area of the separation bed whereby the material may be efficiently "floated" during the shaking operation.

It is another object to provide a relatively simple means for controllably varying the air supply traveling upwardly through the filter bed whereby certain areas of the bed will receive a greater portion of the air, and certain other areas will receive a lesser portion of the air.

More specifically, it is an object to provide a system of elongated spaced slats underlying the separation bed and controlling the flow of air upwardly therethrough.

Still more specifically, it is an object to provide a series of spaced slats underlying the filter bed, in which the spacings between the slats is varied under different areas of the bed to vary the supply of air flowing upwardly through the bed.

These and other objects and advantages will more fully appear from the following description made in connection with the accompanying drawings wherein like reference characters refer to the same or similar parts throughout the several views and in which:

Fig. 3 is a top plan view of the separator bed with the top screen broken away; and Fig. 4 is a vertical sectional view taken substantially along the line 4—4 of Fig. 3.

Figure 2:
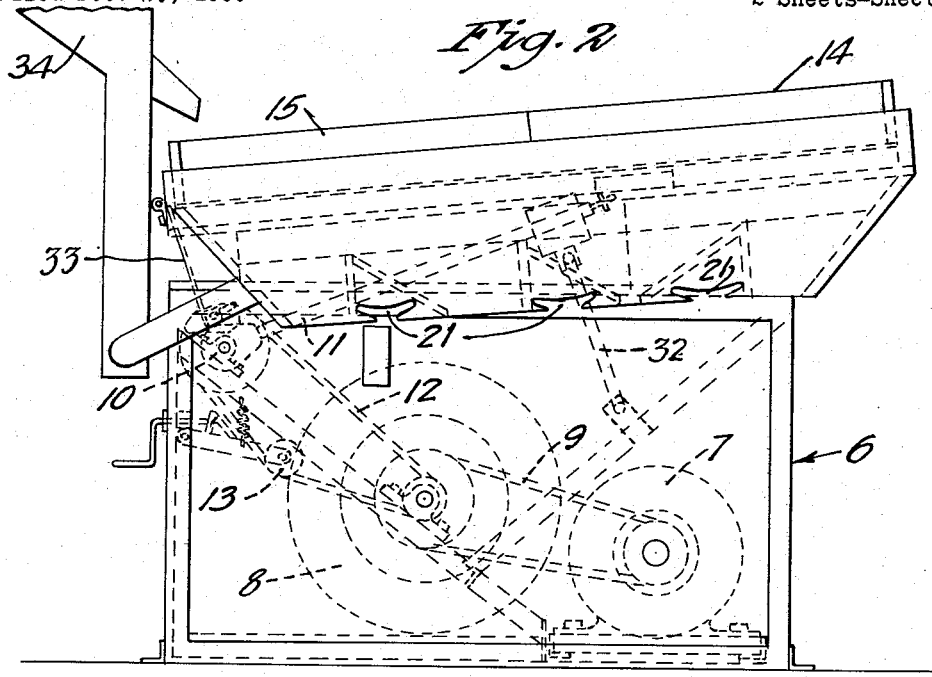
Fig. 2 is a side elevational view of the separator shown in Fig. 1.
Figure 1:
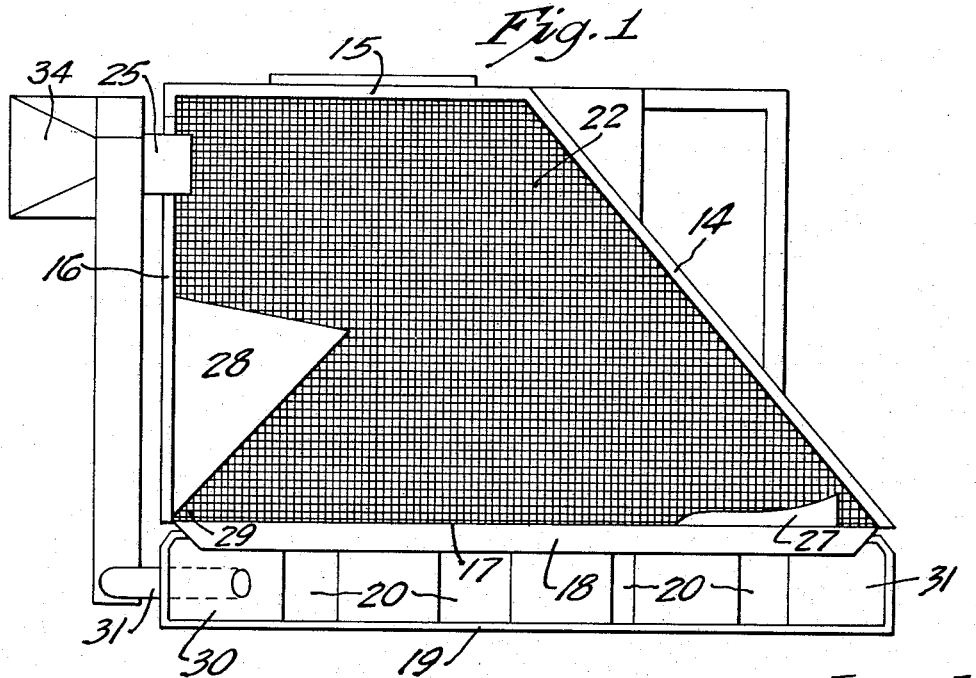
Fig. 1 is a top plan view of a gravity type separator incorporating my new invention.

As illustrated in Figs. 1 and 2, I provide a gravity type separator unit having the supporting base structure designated as an entirety by the numeral 6 with a power source such as the electric motor 7 mounted in the lower portion thereof. The motor 7 drives a blower mechanism 8 as by the belt and pulley driving mechanism 9. The shaft of the blower 8 is connected with a shaker actuating drive mechanism, such as the eccentric 10 and reciprocated arm 11, and this driving connection is made as by the belt and pulley drive 12 having a conventional type belt tightener 13.

A separator bed is mounted for shaking oscillation on the supporting base structure 6 as by the upstanding link member 32 for an intermediate portion thereof, and the link members 33 at the lower rear portion thereof. The reciprocated arm 11 is connected at its end remote from the eccentric 10 to an intermediate portion of the underside of the separator bed. As viewed in top plan, as best shown in Figs. 1 and 3, the separator bed is in the shape of a four sided figure and slopes upwardly toward one end thereof. The upper end thereof is diagonally beveled and has an upstanding retaining rail 14 fixed therealong. Similar rails 15 and 16 are respectively fixed along the two sides adjacent the supply hopper 34, the rail 15 being disposed in substantially parallel opposed relation to the upwardly sloping discharge edge 17 of the separator bed.

An apron 18 is fixed along the discharge edge 17, and carries the material discharged along said edge outwardly therefrom. A frame 19, which is constructed with a plurality of adjustable partitions 20, is mounted along said discharge edge 17, and is constructed to receive the material flowing over the apron 18. The partitions 20 may be shifted longitudinally of the frame to vary the length of the discharge receiving compartments formed within said frame 19. Suitable means, such as the cleats 21, shown in Fig. 2, are provided for attaching bags under the various compartments to receive the material discharged into said compartments.

A screen 22 completely covers the quadrilateral top area of the separator bed, and has a grid work 23 forming a plurality of air mass segregating compartments directly thereunder. This grid work serves not only to segregate the air masses passing upwardly therethrough, but also provides a support for the screen 22, as best shown in Fig. 4. A plurality of air controlling diagonally disposed slats 24 are mounted in fixed relation under grid work 23, and are disposed in substantially parallel spaced relation, one to the other. These slats are provided to permit the volume of air passing upwardly through the grid work 23 to be varied throughout the area of the separator bed, and are terminated before reaching the lowel material receiving corner, shown in Fig. 3, and designated by the letter A, onto which the material to be separated is discharged from a chute 25. This permits an unrestricted volume of air to pass upwardly through the material as it falls onto the screen surface. Also the slats 24 are terminated a slight distance before reaching the heavy material discharge end 26 to permit an unrestricted volume of air to pass upwardly through the material at that area. A stone confining and guiding obstruction 27 is provided at the heavy discharge end 26 and overlies that portion of the screen 22 to prevent discharge of the heavy material into compartments designated for the lighter materials. A guiding obstruction 28 is provided in inwardly extending relation from an intermediate portion of upstanding rail 16, and is, in the form shown, triangular in shape to guide the lighter material outwardly under the center of the screen, and thereafter permits the same to be floated back to the light material discharge end 29 of edge 17.

The material to be separated is initially discharged from chute 25 onto the screen area overlying the unrestricted air flow passages A. The separator bed is reciprocated by the actuating mechanism including the eccentric 10 and reciprocated arm 11, and this shaking action in combination with the upwardly directed flow of air from blower 8 through the bed causes a flotation of the lighter material slightly above the screen or in very light engagement therewith, and causes the heavy material to be carried upwardly to the diagonally beveled retaining rail 14, along which this material travels to the heavy material discharge end 26. The fine material is guided outwardly onto the center portion of the screen by the guiding member 28 and is then permitted to flow back to the fine material discharge end 29, and downwardly into the compartment 30 provided for collection of the fine material, as best shown in Fig. 1. A conveyor 31 carries this fine material back to the hopper and chute 25 for reseparation. The compartment formed next above the fine material receiving compartment receives a granular product somewhat heavier and coarser than the extremely fine material, and the material discharged into each of the compartments formed upwardly from the fine material compartment 30 receives slightly heavier granular material. The obstruction 27 causes all of the extremely heavy material, such as stones and the like, to be discharged into the uppermost compartment 31, from which said material may be passed to a stoner, although the separation of these stones and excessively heavy material from the good grain is relatively complete. Suitable bags may be attached below the respective compartments for collection of the discharged and separated materials, in a conventional manner. The control of the flow of air upwardly through the separator bed is extremely accurate due to the variation in the spacing between the slats 24 under the various areas of the bed. This spacing is relatively close at the fine material discharge end of the discharge edge 17 and progressively increases toward the heavy material discharge end 26 thereof, as best shown in Fig. 3. The spaces between slats 24 are designated by the numeral 24a. Obviously, any desired spacing may be provided for the slats, and it is an extremely easy matter to vary this spacing during the construction of the separator bed. By providing the spaced elongated slats, a series of elongated passages is provided, which are disposed substantially along the lines of travel of the grains of material, as they move outwardly toward the respective zones of the discharge edge 17. These elongated passages work in close cooperation with the air mass segregating compartments formed by the grid work 23, in producing a controlled air supply flowing upwardly from blower 8, the screen 22 and the material being carried thereby.

It will be seen that I have provided an extremely simple, yet highly efficient, control device for the supply of air passing upwardly through the separator bed of a gravity separator, and which will work in close cooperation with the gridwork of said bed to vary the flow of air from one location to another depending upon the spacing between the slats.

It will of course be understood that various changes may be made in the form, details, arrangements, and proportions of the parts without departing from the scope of my invention.

What is claimed is:

In a gravity separator, an inclined separator bed having a lowermost end and an uppermost end with opposite inclined side edges extending between the lowermost and uppermost ends, said lowermost end having an upstanding retaining rail extending longitudinally therealong, one of said side edges having an upstanding retaining rail extending longitudinally thereof and joined with the first mentioned retaining rail, the other side edge being unobstructed to permit material to be discharged thereover, and an upstanding retaining rail extending along the uppermost edge joined with the second retaining rail and forming an obtuse angle therewith, means for introducing granular material upon the bed adjacent the juncture of the first and second retaining rails, said bed including a plurality of thin, upstanding and widely spaced divider partitions arranged in a generally criss-cross gridwork to form a plurality of air mass segregating compartments, a screen overlying said partition and the compartments formed thereby and from which the retaining rails are upstanding, and a plurality of spaced and substantially parallel elongate slats affixed to the bottom of said partitions and extending generally parallel to the last mentioned retaining rail, said spaced slats controlling air flow upwardly therebetween, and the spacing between said slats progressively increasing from that lowermost corner of the bed opposite the corner at which the material is introduced to the retaining rail at the uppermost end of the bed, some of the slats extending continuously between the lowermost end and said other edge with a plurality of adjacent slats terminating along one partition which is spaced from said one side edge and with a plurality of further adjacent slats terminating along a partition which intersects said one partition and is spaced from said lowermost end, such as to present at the material input corner a plurality of air mass segregating compartments which are restricted only by the overlying screen effecting a rapid segregation of fine and coarse material at the input corner, there being a plurality of uppermost slats terminating along a partition spaced from the uppermost corner of the bed to present thereat an area of air means segregating compartments restricted only by the overlying screen whereby when the bed is mounted in a separator and air is supplied upwardly therethrough, fine material will be discharged along the lowermost portion of said other side edge and heavy material will be discharged along the uppermost portion of said other edge.

References Cited in the file of this patent
UNITED STATES PATENTS

| | | |
|---|---|---|
| 1,695,569 | Arms | Dec. 18, 1928 |
| 1,923,917 | Davis | Aug. 27, 1933 |
| 1,961,449 | Peale | June 5, 1934 |
| 1,971,678 | Davis | Aug. 28, 1934 |
| 2,028,904 | Hawarth | Jan. 28, 1936 |
| 2,104,922 | Bradford | Jan. 11, 1938 |
| 2,163,342 | Knight | June 20, 1939 |
| 2,257,624 | Sutton | Sept. 30, 1941 |
| 2,404,414 | Sutton | July 23, 1946 |